UNITED STATES PATENT OFFICE.

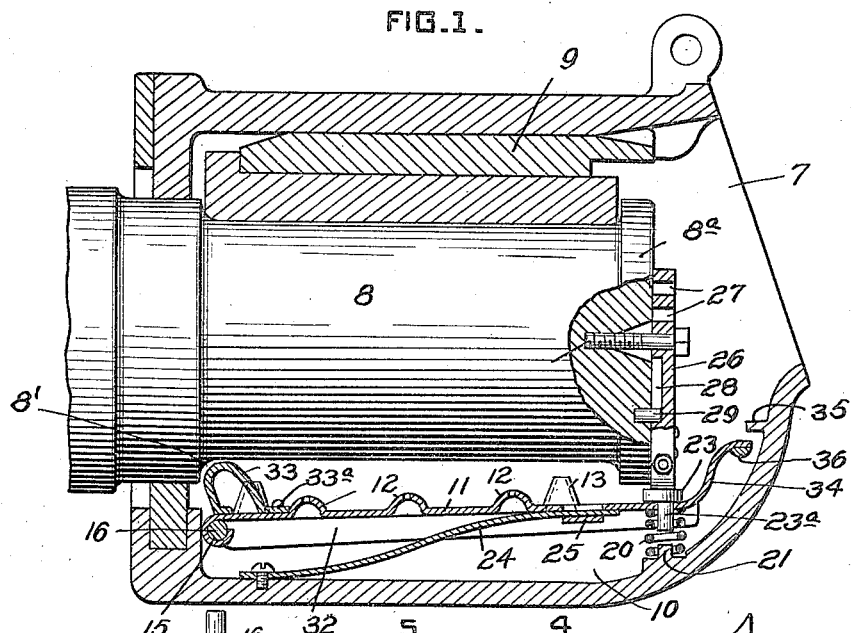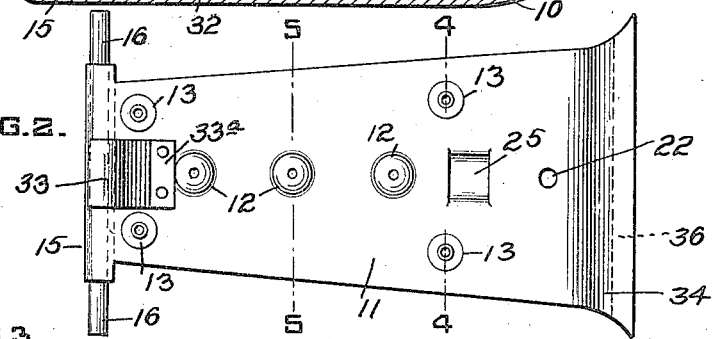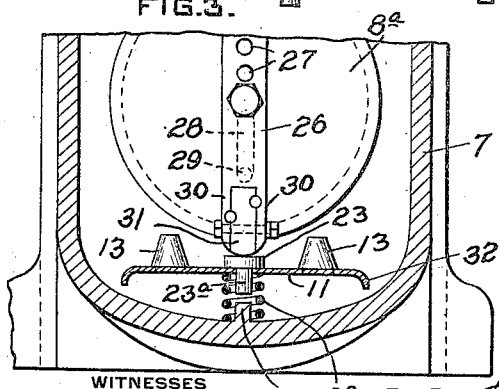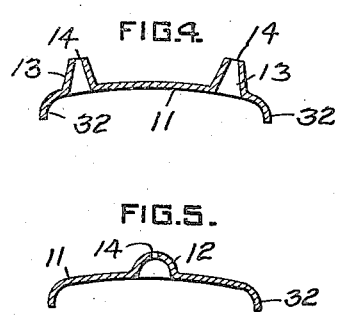

IRA S. DOWNING AND EDWIN S. PEARCE, OF INDIANAPOLIS, INDIANA.

JOURNAL-LUBRICATING DEVICE.

1,302,021.  Specification of Letters Patent.  Patented Apr. 29, 1919.

Application filed May 24, 1918. Serial No. 236,282.

*To all whom it may concern:*

Be it known that we, IRA S. DOWNING and EDWIN S. PEARCE, both residents of Indianapolis, in the county of Marion and State of Indiana, have invented certain new and useful Improvements in Journal-Lubricating Devices, of which the following is a specification.

Our invention relates to an improved lubricating device for a journal box, and has for its principal objects the following:

To provide a positive acting oil feed and flow device designed to obviate the use of waste or other forms of packing in which capillary attraction is utilized to convey oil to the surfaces to be lubricated, and which is adapted to serve as an efficient lubricator for the journal and its bearing and to effect a substantial reduction, approximating fifty per cent., in the quantity of oil required for lubrication purposes; to permit the employment of one grade of oil for summer and winter lubrication; to provide a journal lubricating device dependent upon the rotation of the journal or axle for its actuation; to regulate and proportion the quantity of oil employed in the lubrication of the journal in respect to the speed of rotation of the journal, *i. e.*, the greater the speed the larger the amount of oil that is made available for lubrication purposes; and to provide for and procure the separation of all foreign matter in the oil by virtue of the churning characteristic of the device. The invention also contemplates certain novel details of construction, combination and arrangement of parts of the improved device, whereby certain important advantages are attained, as will be more fully described hereinafter, and pointed out in the claims.

These, together with such other objects and advantages as are incident to our invention, we attain by means of a construction illustrated in preferred form in the accompanying drawings, wherein—

Figure 1 is a longitudinal sectional view of a journal box to which our invention is shown applied;

Fig. 2 represents a top plan view of the projector plate;

Fig. 3 is a cross-sectional view of the box taken in a plane slightly in advance of the journal and its cam.

Figs. 4 and 5 are respectively cross-sectional views of the plate taken along lines 4—4 and 5—5 in Fig. 2; and Fig. 6 represents a detail view of the hinge mounting of the plate at either side of the journal box.

In the views, the reference numeral 7 denotes the journal box, 8 the journal, 9 the customary bearing for the journal, and 10 indicates the oil chamber or reservoir in which is stored the oil designed to be projected upwardly toward and on the journal by the plate 11 in order to lubricate the bearing surfaces between the journal and its bearing. Heretofore, waste or packing saturated with lubricant has been depended upon to lubricate these bearings, but this method has been found wasteful as a considerable proportion of the oil absorbed in the waste was not fully utilized as a lubricant upon the surfaces requiring it, and required the use of different grades of oil for summer and winter lubrication.

This plate 11, which we term an oscillating splash projector plate, is formed centrally and at its sides with a series of oil projecting nozzles 12 and 13, respectively, and designed in the oscillation or depression of the plate upon the oil to direct jets of oil upwardly toward and upon the lower face of the journal in the rotation of the latter. The outlets 14 of the nozzles are so contracted as to give them a higher velocity of discharge than intake, the kinetic energy being employed to carry the oil jet to the journal, as will be readily understood.

The numeral 15 designates a socket or hinge element formed at the rear end of the plate for the reception therethrough of a hinge pintle 16, whose ends have bearings in tapered bushings 17 which are exteriorly threaded to engage in alined openings tapped in opposite portion 7$^a$ of the journal box wall. The end of each bushing is closed by a solid gasket 18 and an interiorly threaded cap 19 is provided to be screwed down upon the rear end of the bushing whereby to position the gasket and prevent leakage of oil past the pintle bearings.

To support the forward end of the plate, and to act as a recoil means therefor, we provide a compression coil spring 20 seated about a boss 21 and having its upper end reacting against the under face of the plate and engaging the same about an opening 22. This opening is provided for the reception of a contact boss 23 whose lower portion 23ª engages in and extends through said opening to coöperate with the boss 21 in order to maintain the spring in position during oscillation of the plate. A supplementary or substitute plate supporting and recoil means may be desirably employed in the form of a flat spring 24 whose lower end is permanently secured to the base of the chamber 10 and which has its upper free end slidably seated in a socket 25 formed by slitting and pressing down a section of the central web portions of the plate (Fig. 2). Either one or both of these means may be employed, and it matters little which particular end of the spring 24 is fixed or free to move.

In order that the plate may be actuated during rotation of the journal, we provide the latter with an eccentric cam 26 designed to intermittently contact or cam with the hardened upper face of the boss 23 during rotative movement of the journal. In the preferred construction, the cam is provided with a series of holes 27 through one of which a retaining stud bolt passes into and engages with the axial portion of the flanged face 8ª of the journal, the other holes being provided for purposes of adjustment, and also has an inner recess or slot 28 within which a dowel pin 29, doweled in said face, adjustably engages to hold the cam against movement about its stud bolt. If desired the lower portions of the cam may be bifurcated to receive within the arms 30 a hardened insert-end piece 31 detachably secured thereto by any suitable fastening means.

As the journal initially rotates the cam in contacting with the boss 23 depresses the hinged plate on an arc about its pivot 16, and when this initial contact, which of course is momentary in character, ceases, the spring means reacts to raise the plate to its normal position. As the rotative movement of the journal continues, and the contacting function of the cam becomes intermittent, the plate vibrates or oscillates sufficiently upon the oil in the box to insure the efficient lubrication of the journal bearing surfaces by means of the oil jets discharging theretoward from the nozzles 12 and 13 which are formed and located in the plate with that purpose in view. This discharging function of the nozzles is rendered more efficient by providing the plate with downwardly extending side flanges or wings 32, 32, disposed in contiguity with the side walls of the box, and which serve to crowd the oil toward the center of the plate and the nozzles and also act to prevent excessive splashing of the oil.

During rotation of the journal the latter also has slight lateral movement relative of the box, and this may be taken advantage of in order to vibrate the plate, either by itself or in conjunction with the cam 26, by providing the member 33 whose base portion 33ª is secured to the plate slightly in advance of its hinge, and which extends upwardly and rearwardly toward the shoulder 8' of the journal so that as the latter moves in the direction of its length contact will result with consequent vibration of the plate.

The front portion of the plate is extended upwardly and forward toward the front wall of the box to provide the extension 34 which in the vibration of the plate has its upward movement limited by the stop rib 35 formed on said front wall. This rib has a length substantially corresponding with that of said extension, and also serves to prevent wastage of oil through the front opening of the box. Preferably this extension 34 may have its forward marginal portion weighted and stiffened by a rib or strip 36 in order to secure the proper balancing of the plate on its spring means and which by means of its inertia promotes and furthers the oscillatory movement of the plate.

Summarizing the descriptive matter already given herein in regard to the operation of an improved device, it may be briefly stated that the journal in rotating acts through the interposition of members 26 and 33, the former being preferred where one is relied upon, to depress the plate and place the spring means under compression, and simultaneously partially submerging or bringing in contact with the oil surface, or oil, the oil agitating plate. The latter by reason of its construction and arrangement forces oil into and through the oil projecting nozzles and against the journal surface, this operation being repeated for each revolution of the journal.

We do not intend to restrict ourselves to the exact construction or to the precise arrangement of the various parts of the device as shown, as it is obvious that variations and modifications of the same may be made without in any way departing from the spirit and scope of the invention as expressed in the following claims.

What we claim is:

1. The combination with a journal box and its journal, and an oil chamber below said journal, of a vibratory lubricating device therefor comprising a plate member provided with vertically directed oil-projecting means, said member hinged in said chamber on an axis disposed substantially at right-angles to the journal axis, and means operative during rotation of the journal for vibrating said plate.

2. The combination with a journal box and its journal, and an oil chamber below said journal, of a lubricating device therefor comprising a vibratory splash plate member formed in its body portion with upwardly directed nozzle means capable of projecting a discharge of oil therethrough to lubricate the journal, said member yieldingly mounted in said chamber to vibrate up and down on substantially a short arc, and means for imparting vibratory movement to said plate as the journal rotates.

3. The combination with a journal box and its journal, and an oil chamber below said journal, of a splash plate member having marginal flanges and a nozzle bearing portion provided with oil-directing nozzles intermediate said flanges, said member yieldingly and hingedly mounted for vibratory movement in said chamber on an axis disposed substantially at right-angles relative the journal axis, and means operatively interposed between the journal and said plate member for actuating the latter as the former rotates.

4. As an article of manufacture, a lubricating splash plate having a substantially flat body portion provided intermediately its ends with an elongated oil-directing nozzle disposed substantially at right-angles with respect to said body portion.

5. As an article of manufacture, a lubricating splash plate having a substantially flat body portion provided intermediately its ends with an elongated oil-directing nozzle disposed substantially at right-angles with respect to said body portion, said nozzle having a tapered oil passage extending from one side of the body portion to a point beyond the other side.

6. The combination with a journal box and its journal, and an oil chamber below said journal, of a lubricating device therefor comprising a plate mounted for vibration in said oil chamber and provided with means for effecting a discharge of oil therethrough to lubricate the journal, means operative during rotation of the journal for vibrating said plate, and a stop device positioned for limiting the movement of said plate.

7. The combination with a journal box and its journal and an oil chamber below said journal, of a lubricating device therefor comprising a plate mounted for vibration in said oil chamber and provided with means for effecting a discharge of oil therethrough to lubricate the journal, means operative during rotation of the journal for vibrating said plate, a stop device positioned for limiting the movement of said plate, and a weighted balancing member for the plate adjacent said stop device.

8. The combination with a journal box and its journal, and an oil chamber below said journal, of a metallic flanged plate member mounted in said chamber for vibration about a point in said box and provided with a series of upwardly directed nozzles designed to effect a discharge of oil whereby to lubricate the bearing during vibratory movement of said member, means for yieldingly holding said member in normal position, and means interposed between the journal and said plate for actuating the latter as the former rotates, said first mentioned means serving to restrain the action of the last mentioned means and to return the plate to normal position.

9. The combination with a journal box and its journal, and an oil chamber below said journal, of a substantially flat plate mounted for vibration in said oil chamber and provided with nozzle means for effecting a discharge of oil to lubricate the journal, and a cam carried by said journal for actuating said plate.

10. The combination with a journal box and its journal, and an oil chamber below said journal, of a plate member mounted for vibratory movement in the oil in said chamber and provided with nozzle means for effecting an upward discharge of oil to said journal, a compression spring device for normally positioning and supporting said member, a stop means for said member, and an eccentric cam adjustably mounted upon the front face of the journal for imparting movement to said plate as the journal rotates.

11. As an article of manufacture, an oil splash plate for use in journal boxes provided with attaching means therefor and a series of oil directing nozzles in the body thereof.

12. As an article of manufacture, a lubricating splash plate provided near one end with a hinge element and a series of nozzles formed in the body thereof in advance of said end.

13. The combination with a journal box and its journal, and an oil chamber below said journal, of a vibratory lubricating device therefor comprising a plate member substantially horizontally disposed in said chamber and provided with upwardly directed oil-projecting means, means adapted for positioning said member including a spring, and an actuating device coöperating with said spring during rotation of said journal to vibrate the plate member up and down, said oil-projecting means capable of projecting a supply of oil from the chamber to lubricate the journal during vibration of said plate member.

14. The combination with a journal box and its journal and oil chamber, of an oil-projecting device comprising a yielding apertured member, and means on the journal for positively engaging and depressing said member in the oil to project the oil through the aperture.

15. The combination with a journal box and its journal, and an oil chamber, of an oil projecting device comprising a nozzle, a nozzle carrier yieldingly mounted in said box, and means on the journal for positively engaging and depressing said carrier so as to project oil in the chamber through the nozzle to the journal.

IRA S. DOWNING.
EDWIN S. PEARCE.

Copies of this patent may be obtained for five cents each, by addressing the "Commissioner of Patents, Washington, D. C."